Patented Jan. 25, 1949

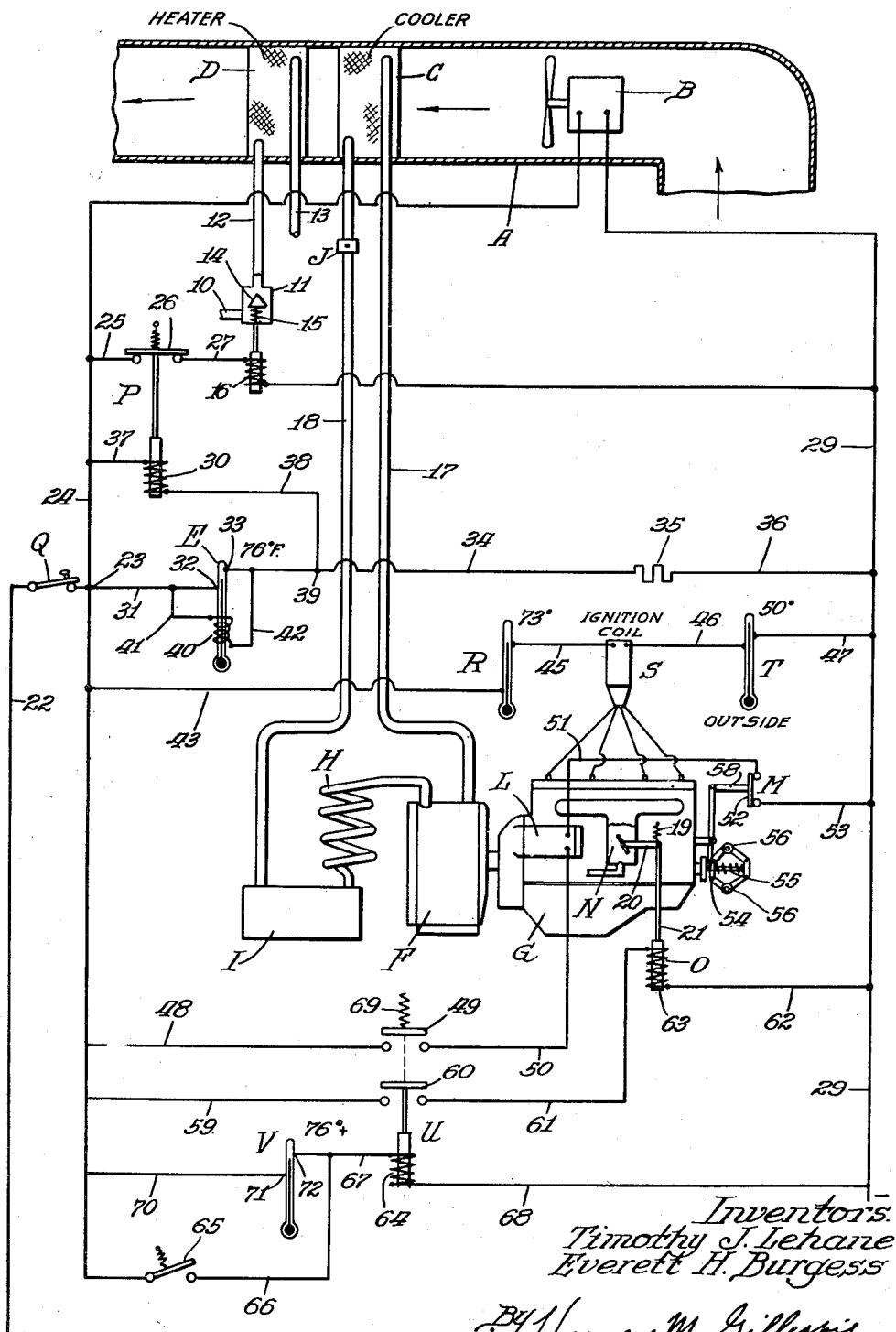

2,460,135

UNITED STATES PATENT OFFICE 2,460,135

ELECTRIC CONTROL FOR BUS HEATING AND COOLING SYSTEMS

Timothy J. Lehane and Everett H. Burgess, Chicago, Ill., assignors, by mesne assignments, to Vapor Heating Corporation, a corporation of Delaware Application September 23, 1946, Serial No. 698,770

6 Claims. (Cl. 257—3)

This invention relates to improvements in electric control for a combined heating and cooling system for buses or other situations in which an internal combustion engine is used as a motive power for operating the cooling apparatus.

A principal object of the invention is to provide in a heating and cooling system of the above character an improved electrical control for the heating and cooling apparatus whereby the heating apparatus under certain conditions is operative independently of the cooling apparatus, the cooling apparatus under certain other conditions is operative independently of the heating apparatus, and under certain other conditions both heating and cooling apparatus are operative simultaneously so that the air delivered into the space is first cooled and thereafter reheated sufficiently to maintain the desired temperature within the space being controlled. The cooling of the air preliminary to applying heat thereto makes it practicable to recirculate air in a bus and in other space heating and cooling systems in which an internal combustion engine is used to provide the motive power for the cooling system.

A further object of the invention is to provide, in a heating and cooling system having two-stage cooling, control devices which are cooperatively connected in the control circuits of the heating and cooling apparatus so as to permit operation of the heating apparatus simultaneously with the low capacity operating stage of the cooling apparatus and which will effect a transfer from the combined heating and cooling function to full cooling or vice versa at substantially the same control point; for example, the heating function will cease at a predetermined control point and full cooling will start at slightly above such control point.

Other objects and advantages of the invention will be apparent from the detailed description of the embodiment of the invention shown in the accompanying drawing.

The invention is illustrated diagrammatically in the accompanying drawing as comprising a conduit A through which air is drawn from an enclosed space by means of an electrically operated fan B and forced through a cooling radiator C and thereafter through a heating radiator D before it is re-introduced into the enclosed space. The cooling and heating radiators C and D are preferably arranged in the conduit A. The heating radiator D is supplied with heating medium, hot water or steam, from any convenient source; for example, from the hot water jacket of an internal combustion engine or from a separately operated boiler. The heating medium passes from the source through pipe 10 into a valve casing 11 and thence through pipe 12 into the radiator D and discharges through the return pipe 13. The supply of heating medium to the radiator D is controlled by means of a valve 14 which is normally closed by a spring 15 and is opened by an electrically energized solenoid 16 under the control of a thermostat E.

The cooling apparatus, including the radiator C, may be substantially as shown in our co-pending application Serial No. 684,625, filed August 5, 1946. The said cooling mechanism may be described briefly as comprising a compressor F which is connected with a return pipe 17 leading from the cooling radiator C. The compressor F is operated by an internal combustion engine G so as to withdraw the coolant fluid from the cooling radiator C and discharge it through a condenser coil H into a collecting vessel I, the latter of which is connected by supply pipe 18 with the inlet port of the cooling radiator C. An expansion valve J is interposed in the supply pipe 18 to control the delivery of coolant into the cooling radiator C.

The internal combustion engine G is preferably provided with an electrically energized starter L together with a circuit breaker M for de-energizing the starter circuit when the engine develops sufficient speed to insure its continued operation. The engine is provided with a throttle valve N which is normally held in a partially closed position by means of a spring 19, whereby the engine is operated at low speed. However, when starting the engine, it is desirable to have the throttle valve N in its wide open position. The throttle is, therefore, connected through a lever 20 and rod 21 to a solenoid O adapted, when energized, to move the throttle N to its full open position.

The electric circuits for controlling the operation of the combined heating and cooling system include a circuit for controlling the operation of the heat supply valve 14, a circuit for energizing the ignition of the engine G, a circuit for energizing the engine starter L and a circuit for energizing the solenoid O to adjust the position of the throttle N.

The electric circuit for energizing the valve solenoid 16 is controlled by a relay P which is controlled by the thermostat E. The said valve energizing circuit leads from the positive line 22 through a manually operable switch Q to terminal 23 and thence through wires 24 and 25, closed contact 26 of relay P and wire 27 through solenoid coil 16 and thence through wire 28 to the negative line 29.

The relay P includes a solenoid 30 which is connected in parallel with the thermostat E so that it is energized only when the mercury column of thermostat E is below the upper contact 33 of the thermostat. The thermostat circuit leads from terminal 23 through wire 31 to the lower contact 32 of thermostat E thence through the mercury column of the thermostat and upper contact 33 to wire 34, resistor 35 and wire 36 to the negative line 29. The circuit for energizing relay P, as before indicated, is connected in parallel with the thermostat E; the said circuit leading from terminal 23, wires 24 and 37 through solenoid coil 30 and wire 38 to junction 39 in wire 34.

The thermostat is provided with an electric heater 40 which is connected by wires 41 and 42 to wires 31 and 34, respectively, which lead to and from the thermostat contacts 32 and 33.

When the temperature at the thermostat is below its temperature setting, the relay P is energized to close the circuit for opening the heat valve 14 so as to deliver heating medium into heat radiator D and thereby add heat to the stream of air forced through conduit A into the controlled space. Simultaneously with this heating operation, the auxiliary heater is energized to add heat to the thermostat E. The thermostat, for the purpose of illustration, is set to function (close its upper contact) at a temperature of 76° Fahrenheit and the auxiliary heater has a value of 3°. Consequently, the thermostat E will cycle with increasing rapidity as the temperature of the space rises from 73° to 76° and the heat valve 14 will be maintained closed when the space temperature reaches 76°.

The circuit for energizing the ignition system of the engine leads from positive line 22 through the main switch Q to wire 24, thence through wire 43 to the lower contact 44 of a thermostat R and thence through wire 45 to the engine ignition coil S and wire 46 to the lower contact of thermostat T, thence from the upper contact of thermostat T through wire 47 to the negative line 29.

The thermostat R is located inside the controlled space and is set to function at 73° Fahrenheit. This thermostat T responds to the outside temperature and is preferably set to function at a temperature of 50°. It will be seen, therefore, that the ignition system of the engine G is made effective simultaneously with the first closing of heat control thermostat E at 73° if the outside temperature is above 50° so as to warrant cooling and reheating of the air circulated within the enclosed space. This cycle of operation of the combined system is accomplished by operating the engine G at its idling speed after it has been started with wide-open throttle.

The engine starter circuit leads from main switch Q and wires 24 and 48, the upper contact 49 of a relay U, wire 50 through the starter L, and thence through wire 51 and closed contact 52 of the automatic circuit breaker M and wire 53 to the negative line 29. The automatic circuit breaker M may be of any conventional form suitable for opening the starter energizing circuit of the engine when the engine attains sufficient speed to insure its continued operation. For purposes of illustration, the said automatic circuit breaker is illustrated as comprising a sleeve 54 which is movable horizontally on a revolvable shaft 55. A pair of weights 56, 56 are pivotally supported on the shaft 55 and to the sleeve 54 so that the centrifugal force incident to the rotation of the shaft 55 will cause the weights and said sleeve to move outwardly on the shaft 55. The sleeve 54 is connected by means of a forked lever 57 and an insulated rod 58 to the normally closed contact 52. Consequently, the outward movement of the sleeve 54 imparts an inward movement to the contact 52 and opens the starter energizing circuit. When the engine stops, the weights 56, 56 return to their lower positions and the contact 52 assumes a position to close the circuit at the contact and thereby puts it in readiness to energize the starter L when the circuit is again closed through contact 39 of relay U.

The throttle adjusting circuit leads from the positive line 22 and wire 24 through wire 59, lower contact 60 of relay U, wire 61, solenoid 34 and wire 35 to the negative line 29. The solenoid O includes a movable core 63 which is connected by means of the rod 21 to the actuating arm 20 fixed to the throttle N. It will be seen, therefore, that when the throttle adjusting circuit is closed at the contact 60 of relay U, the core 63 of the solenoid will be drawn into the coil thereof and thereby move the throttle N to its fully open position.

The relay U is energized to simultaneously close the previously described engine starting and throttle adjusting circuits by the energization of an actuating coil 64. This coil energizing circuit leads from the positive line 24 through a manually operated switch 65, wire 66 to wire 67, thence through the relay coil 64 and wire 68 to the negative line 29. The circuit just described will ordinarily be closed only momentarily to facilitate starting the engine with its throttle N wide open. As soon as the manual switch 65 is released, the coil 64 will be de-energized. Consequently, the relay U will move, under the tension of spring 64, to open the starter energizing circuit and also the throttle adjusting circuit, whereby the throttle is permitted to move under the action of spring 19 to its partially closed or slow speed position.

During this low speed operation of engine G and compressor F, the cooling mechanism will operate at a low speed so as to cool the air withdrawn from the enclosed space before the air is reheated and re-introduced into the space. This combined functioning of the heating and cooling apparatus serves to maintain the temperature of the enclosed space at or below the functional setting of thermostat E. The cycling of the thermostat E when the inside temperature of the space approaches its functional setting insures against overheating of the enclosed space.

If the temperature of the enclosed space rises above the functional setting of thermostat E, for example 76° Fahrenheit, the heating apparatus will discontinue its heating function, but the low stage cooling function will continue. If the temperature of the space thereafter rises to a point slightly above 76° Fahrenheit, the engine G will be automatically speeded up so as to increase the cooling effect of the cooling apparatus. The speed-up of the engine G is effected by the automatic energization of the solenoid 64 of relay U. The automatic energizing circuit through solenoid 64 is controlled by an inside thermostat V which is set to function slightly above 76° so that it will take control of the cooling system after the heater thermostat E has functioned to shut off the supply of heat. The automatic energizing circuit for solenoid 64 leads from positive wire 24 to wire 70 to the lower contact 71 of thermostat V and thence through the mercury column of the thermostat to its upper contact 72 and wire 67, solenoid 64 and wire 68 to the negative line 29.

If the full functioning of the cooling apparatus is sufficient to reduce the temperature of the enclosed space to a point below the temperature setting of thermostat V, the effectiveness of the cooling apparatus will be reduced because of the reduced speed of engine G. If the temperature continues to fall below the temperature setting of thermostat E the heating apparatus will be energized so as to function conjointly with the low stage operation of the cooling apparatus so as to apply heat to the previously cooled air. The amount of heat supplied will automatically be very slight, since the auxiliary heater 40 of thermostat E will function as soon as its contact is broken to again move its mercury column into contact. Consequently, the supply of heating medium to the radiator D will be limited by the momentary or intermittent operation of the valve 14. If the temperature of the enclosed space continues to fall, the heat supply valve 14 will remain open for longer periods. Finally, if conditions are such as to force the temperature below 73° the ignition circuit for the engine is made ineffective and consequently, the functioning of the cooling apparatus ceases, and thereby transfers the entire temperature control function to the heat control thermostat E.

We claim:

1. In combination with heating apparatus including a radiator for heating an enclosed space and an apparatus for cooling said space including an internal combustion engine for operating the cooling apparatus, the engine being provided with an electrical ignition circuit and an electrically energized starter for starting the engine; of means for cooperatively controlling the heating and cooling apparatuses comprising an electrically energized valve for delivering heating medium to the raidator; means including a thermostat having a pre-determined functional setting, a control circuit in which said thermostat is interposed and a relay connected in said control circuit in parallel with said thermostat for controlling the effectiveness of said valve to deliver heating medium to said radiator; a second thermostat interposed in said ignition circuit and having a functional setting lower than the functional setting of the first thermostat; and an auxiliary electric heater for the first thermostat connected in said control circuit at opposite sides of the thermostat and having a value equal to the difference in the functional setting of said first and second thermostats so that the first thermostat will function momentarily at temperatures corresponding to the functional setting of the second thermostat; whereby the heating apparatus is operable alone at temperatures below the functional setting of the second thermostat and is operated intermittently in conjunction with the cooling apparatus at temperatures between the functional settings of the two thermostats.

2. In combination with heating apparatus including a radiator for heating an enclosed space and an apparatus for cooling said space including an internal combustion engine for operating the cooling apparatus, the engine being provided with an electrical ignition circuit and an electrically energized starter for starting the engine; of means for cooperatively controlling the heating and cooling apparatuses comprising an electrically energized valve for delivery heating medium to the radiator; means including a thermostat having a pre-determined functional setting, a control circuit in which said thermostat is interposed and a relay connected in said control circuit in parallel with said thermostat for controlling the effectiveness of said valve to deliver heating medium to said radiator; a second thermostat interposed in said ignition circuit and having a functional setting lower than the functional setting of the first thermostat; and an auxiliary electric heater for the first thermostat connected in said control circuit at opposite sides of the thermostat and having a value sufficient to cause the first thermostat to function at temperatures corresponding to the functional setting of the second thermostat; whereby the heating apparatus is operable alone at temperatures below the functional setting of the second thermostat and is operated intermittently in conjunction with the cooling apparatus at temperatures between the functional settings of the two thermostats; means including a manually operable device for closing an electric circuit through the engine starter; and means including a third thermostat responsive to temperatures of the space and operable at a temperature within the space higher than the functional setting of the first thermostat to automatically close an energizing circuit through said starter.

3. In combination with heating apparatus including a radiator for heating an enclosed space and an apparatus for cooling said space including an internal combustion engine for operating the cooling apparatus, the engine being provided with an electrical ignition circuit, and an electrically energized starter for starting the engine, and a throttle valve normally supported in partially open position to maintain slow speed operation of the engine; of means for cooperatively controlling the heating and cooling apparatuses comprising an electrically energized valve for delivering heating medium to the radiator; means including a thermostat responsive to temperature changes within the enclosed space and set to function at a pre-determined temperature to close said valve; a second thermostat responsive to temperature changes within the enclosed space and set to function at a lower temperature than the first thermostat to make said ignition circuit effective; electrically energized throttle opening means for moving said throttle to its full open position; and an electrically energized relay for simultaneously closing an energizing circuit through said starter and through said throttle opening means; manually operable means for momentarily energizing said relay, whereby the engine may be started with fully opened throttle and thereafter return to its low speed operation; a third thermostat responsive to the temperature of the enclosed space and set to function at a space temperature slightly higher than the functional setting of the first thermostat to automatically energize said relay to close the energizing circuit through said throttle opening means; whereby the operation of the cooling apparatus is shifted from low to full speed operation when the temperature of the enclosed space rises slightly above the temperature at which the first thermostat functions to stop the heating apparatus.

4. In combination with heating apparatus including a radiator for heating an enclosed space and an apparatus for cooling said space including an internal combustion engine for operating the cooling apparatus, the engine being provided with an electrical ignition circuit, and an electrically energized starter for starting the engine, and a throttle valve normally supported in partially open position to maintain slow speed operation of the engine; of means for cooperatively controlling the heating and cooling apparatuses comprising an electrically energized valve for delivering heating medium to the radiator; means including a thermostat responsive to temperature changes within the enclosed space and set to function at a pre-determined temperature to close said valve; a second thermostat responsive to temperature changes within the enclosed space and set to function at a lower temperature than the first thermostat to make said ignition circuit effective; electrically energized throttle opening means for moving said throttle to its full open position; and an electrically energized relay for simultaneously closing an energizing circuit through said starter and through said throttle opening means; manually operable means for momentarily energizing said relay, whereby the engine may be started with fully opened throttle and thereafter return to its low speed operation; and an auxiliary electric heater for the first thermostat having heating value equal to the temperature space between the settings of the first and second thermostats, whereby the heating apparatus will be operated intermittently to supply heat to the enclosed space during the low speed operation of the cooling apparatus; a third thermostat responsive to the temperature of the enclosed space and set to function at a space temperature slightly higher than the functional setting of the first thermostat to automatically energize said relay to close the energizing circuit through said throttle opening means; whereby the operation of the cooling apparatus is shifted from low to full speed operation when the temperature of enclosed space rises slightly above the temperature to which the first thermostat functions to make the heating apparatus ineffective.

5. In combination with means including a conduit and a fan for withdrawing air from an enclosed space and thereafter re-introducing the air into the space, a radiator in the conduit for heating the air and a cooling apparatus including a cooler in said conduit for cooling said air, an internal combustion engine provided with an electrical ignition circuit, an electrically energized starter and a throttle valve normally supported in partially opened position to maintain slow speed operation of the engine; of means for cooperatively controlling the heating and cooling apparatuses comprises an electrically energized valve for delivering heating medium to the radiator; means including a thermostat responsive to temperature changes within enclosed space and set to function at a pre-determined temperature to close said valve; a second thermostat responsive to temperature changes within the enclosed space and set to function at a lower temperature than the first thermostat to make said ignition circuit effective; electrically energized throttle opening means for moving said throttle to its full open position; and an electrically energized relay for simultaneously closing an energizing circuit through said starter and through said throttle opening means; manually operable means for momentarily energizing said relay to start said engine with fully open throttle and thereafter permit the engine to return to its low speed operation, whereby the heating apparatus is effective to re-heat the air during the low stage cooling of the cooling apparatus.

6. In combination with means including a conduit and a fan for withdrawing air from an enclosed space and thereafter re-introducing the air into the space, a radiator in the conduit for heating the air and a cooling apparatus including a cooler in said conduit for cooling said air, an internal combustion engine provided with an electrical ignition circuit, an electrically energized starter and a throttle valve normally supported in partially opened position to maintain slow speed operation of the engine; of means for cooperatively controlling the heating and cooling apparatuses comprises an electrically energized valve for delivering heating medium to the radiator; means including a thermostat responsive to temperature changes within enclosed space and set to function at a pre-determined temperature to close said valve; a second thermostat responsive to temperature changes within the enclosed space and set to function at a lower temperature than the first thermostat to make said ignition circuit effective; electrically energized throttle opening means for moving said throttle to its full open position; and an electrically energized relay for simultaneously closing an energizing circuit through said starter and through said throttle opening means; manually operable means for momentarily energizing said relay to start said engine with fully open throttle and thereafter permit the engine to return to its low speed operation, whereby the heating apparatus is effective to re-heat the air during the low stage cooling of the cooling apparatus; a third thermostat responsive to the temperature of the said space and set to function at a space temperature slightly higher than the functional settings of the first thermostat to automatically energize said relay to close the energizing circuit through said throttle opening means; whereby the re-heating of the air is discontinued and the cooling apparatus is operated at its full capacity when the temperature of the enclosed space rises slightly above the temperature at which the first thermostat functions to make the heating apparatus ineffective.

TIMOTHY J. LEHANE.
EVERETT H. BURGESS.

REFERENCES CITED

The following references are of record in the file of this patent:

UNITED STATES PATENTS

| Number | Name | Date |
| --- | --- | --- |
| 2,274,153 | Miller et al. | Feb. 24, 1942 |
| 2,346,592 | Lehane et al. | Apr. 11, 1944 |
| 2,355,040 | Alexander et al. | Aug. 8, 1944 |